United States Patent
Ozaki et al.

[11] Patent Number: 5,923,560
[45] Date of Patent: *Jul. 13, 1999

[54] METHOD FOR DYNAMICALLY COMPENSATING FOR TOOL ABRASION IN A NUMERICALLY-CONTROLLED MACHINE TOOL

[75] Inventors: Yasuo Ozaki; Tomoo Hayashi, both of Shizuoka-ken, Japan

[73] Assignee: Toshiba Kikai Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/699,779

[22] Filed: Aug. 20, 1996

[30] Foreign Application Priority Data

Aug. 22, 1995 [JP] Japan .................. P07-213565

[51] Int. Cl.$^6$ ........................................ G06F 19/00
[52] U.S. Cl. .................. 364/474.17; 364/474.34; 409/80; 409/186; 82/1.11
[58] Field of Search ........................ 364/474, 475, 364/474.17, 474.34; 51/5; 451/5; 82/1.11; 409/80, 186

[56] References Cited

U.S. PATENT DOCUMENTS

| | | |
|---|---|---|
| 4,442,493 | 4/1984 | Wakai et al. .................. 364/474.19 |
| 4,451,892 | 5/1984 | McMurtry .................... 364/474.34 |
| 4,497,029 | 1/1985 | Kiyokawa .................... 364/474.17 |
| 4,784,541 | 11/1988 | Umehara et al. ............... 409/186 |
| 5,097,632 | 3/1992 | Yamamori et al. .............. 451/5 |
| 5,802,937 | 9/1998 | Day et al. ..................... 82/1.11 |
| 5,827,020 | 10/1998 | Fujita et al. ................... 409/80 |

FOREIGN PATENT DOCUMENTS 6-179151  6/1994  Japan .

OTHER PUBLICATIONS

Japanese Abstract of 179151.

Primary Examiner—William Grant
Assistant Examiner—Sheela S. Rao
Attorney, Agent, or Firm—Finnegan, Henderson, Farabow, Garrett & Dunner, L.L.P.

[57] ABSTRACT

A method of the invention detects a machining load acting on a tool during a machining process, estimates abrasion amount of the tool based on the machining load and a tool abrasion characteristic registered in advance in a memory, and changes automatically tool position compensation amount based on the tool abrasion. The estimating computation of tool abrasion amount is performed by, for example, obtaining in advance a tool abrasion coefficient based on tool abrasion amount per unit time when a main spindle load current value is taken as a reference machining current value, and integrating for a machining time the product of a ratio of a main spindle load current value during an actual machining process to the reference current value and said tool abrasion coefficient.

3 Claims, 3 Drawing Sheets

FIG.3

| TOOL NUMBER | TOOL LENGTH COMPENSATION AMOUNT STORING AREA (mm) | TOOL ABRASION COEFFICIENT STORING AREA (mm) | REFERENCE MACHINING CURRENT STORING AREA [A] | TOOL ABRASION AMOUNT STRING AREA (mm) |
|---|---|---|---|---|
| 1 | 100.000 | 0.025 | 25.6 | 0.120 |
| 2 | 120.000 | 0.017 | 17.3 | 0.256 |
| 31 | 78.500 | 0.004 | 32.5 | 0.718 |
| 17 | 310.234 | 0.031 | 11.7 | 1.381 |
| ------ | ------ | ------ | ------ | ------ |

# METHOD FOR DYNAMICALLY COMPENSATING FOR TOOL ABRASION IN A NUMERICALLY-CONTROLLED MACHINE TOOL

BACKGROUND OF THE INVENTION

1. Field of the Invention

The present invention relates to a method for dynamically compensating for tool abrasion in a numerically-controlled (NC) machine tool.

2. Description of the Related Art

In an numerically-controlled (NC) machine tool, a machining process is performed by shifting (offsetting) a tool position by a tool dimension, such as a tool length, by a machining program. This is performed by describing a tool position offset amount (a tool length compensation amount) or a tool diameter compensation amount for performing a tool length compensation by a machining program of a G code. Because abrasion during a machining process changes tool dimension, such as a tool length, it is necessary to change a tool length compensation amount and the like relative to the tool abrasion.

Until recently, an operator has periodically measured a tool dimension and changed the tool length compensation amount and the like based on the measurement, or, as disclosed in Japanese laid-open publication Tokkaihei No.6-179151, a system automatically measures tool length at a specified time interval or a specified machining distance and then automatically updates a tool length compensation amount based on tool length measurement value obtained by the automatic measurement.

Tool abrasion gradually increases according to its operation time. According to the prior art, tool position compensation in relation to tool length and the like is performed at a certain time interval and tool position compensation amount does not change until the next tool position compensation. Because the tool position compensation is performed in stages of the time interval of tool position compensation, this method lacks in real-time performance.

A tool length measuring and compensating apparatus, disclosed in Japanese laid-open publication Tokkaihei No.6-179151, improves machining accuracy by shortening the time interval at which the tool compensation is performed by automatic measurement of the tool length. However, the shorter the interval of automatic measurement of the tool length is, the longer the time when the machining process is interrupted, thus decreasing machining efficiency.

SUMMARY OF THE INVENTION

The present invention addresses the above-mentioned problem. An object of the invention is to provide a method for dynamically compensating for tool abrasion in a numerically-controlled machine tool by continuously and accurately performing a tool position compensation with an excellent real-time performance for tool abrasion with improved machining efficiency.

In order to attain the above-mentioned object, the method of the invention for dynamically compensating for tool abrasion in a numerically-controlled machine tool, comprises the steps of detecting a machining load acting on a tool during a machining process, estimating abrasion of the tool based on machining load and a tool abrasion characteristic registered in a memory, and automatically changing a tool position compensation amount based on the abrasion.

In the method for dynamically compensating for tool abrasion in a numerically-controlled (NC) machine tool as defined above, tool abrasion is estimated based on a machining load acting on the tool during a machining process and the tool abrasion characteristic registered in a memory, and the tool position compensation amount is automatically changed based on this tool abrasion. Thus, it is possible to perform the tool position compensation continuously and accurately with an excellent real-time performance for tool abrasion without interrupting the machining process, and to efficiently perform a high-precision machining process.

In another aspect of the invention, the method for dynamically compensating for tool abrasion in a numerically-controlled machine tool comprises the steps of, in addition to the method defined above, obtaining a tool abrasion coefficient based on tool abrasion per unit time when a main spindle load current value is taken as a reference machining current value, and estimating abrasion of the tool based on a cumulative value obtained by integrating, for a machining time, the product of a ratio of a main spindle load current value during an actual machining process to the reference machining current value, and the tool abrasion coefficient.

In a method for dynamically compensating for tool abrasion in a numerically-controlled (NC) machine tool as defined above, a tool abrasion coefficient is obtained based on a tool abrasion per unit time when a main spindle load current value is taken as a reference machining current value, and tool abrasion is estimated based on a cumulative value obtained by integrating for a machining time the product of a ratio of a main spindle load current value during an actual machining process to the reference machining current value and the tool abrasion coefficient. Thus, it is possible to precisely perform estimation of the tool abrasion without requiring many computing conditions, sensors, and the like.

In another aspect of the invention, the method for dynamically compensating for tool abrasion in a numerically-controlled machine tool comprises the steps of, in addition to the method defined above, estimating tool abrasion in a tool-length direction, and performing tool length compensation by subtracting the tool abrasion from tool length compensation amount registered in a memory.

In a method for dynamically compensating for tool abrasion in a numerically-controlled (NC) machine tool as defined above, tool abrasion in the tool-length direction is estimated, and tool length compensation is performed by subtracting the tool abrasion from the tool length compensation amount registered in advance in a memory. Thus, it is possible to perform the tool position compensation continuously and accurately with an excellent real-time performance for tool abrasion without interrupting the machining process, and perform a high-precision machining process efficiently.

BRIEF DESCRIPTION OF THE DRAWINGS

FIG. 3 is an explanatory figure for showing an example of configuration of storage areas of a memory used in a method for dynamically compensating for tool abrasion according to the present invention.

DESCRIPTION OF THE PREFERRED EMBODIMENT

An embodiment of the present invention is described in detail in the following and in the accompanied drawings.

Figure 1:
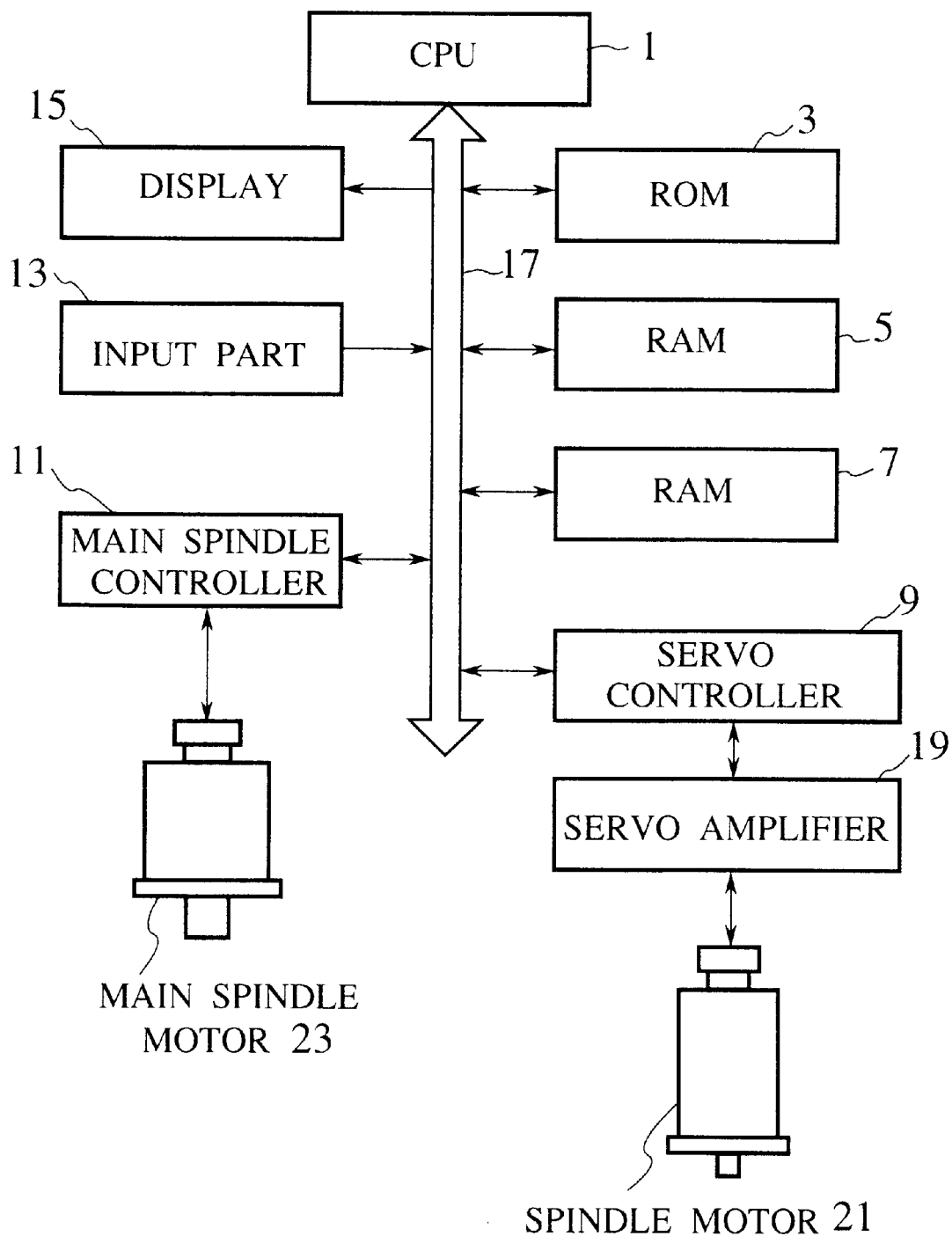
FIG. 1 is a block diagram for showing an example of a numerically-controlled apparatus implementing a method for dynamically compensating for tool abrasion according to the present invention.

FIG. 1 shows an example of a numerically-controlled (NC) apparatus implementing a method for dynamically compensating for tool abrasion according to the invention. This numerically-controlled (NC) apparatus, which is a computer numerical control (CNC) system, comprises a CPU 1, a ROM 3 for storing a system program and the like, a RAM 5 as a working memory for temporarily storing various data, a RAM 7 for storing a machining program, tool data and the like, a servo controller 9, a main spindle controller 11, an input part 13 of a tape reader, a ten-key pad and the like, and a display 15. As illustrated in FIG. 1, the parts are all connected with one another by a bus 17.

The servo controller 9 is connected with a servo amplifier 19, and the servo amplifier 19 is connected to a servomotor 21. The main spindle controller 11 is connected to a main spindle motor 23 for turning a tool (not illustrated in the drawing).

Figure 2:
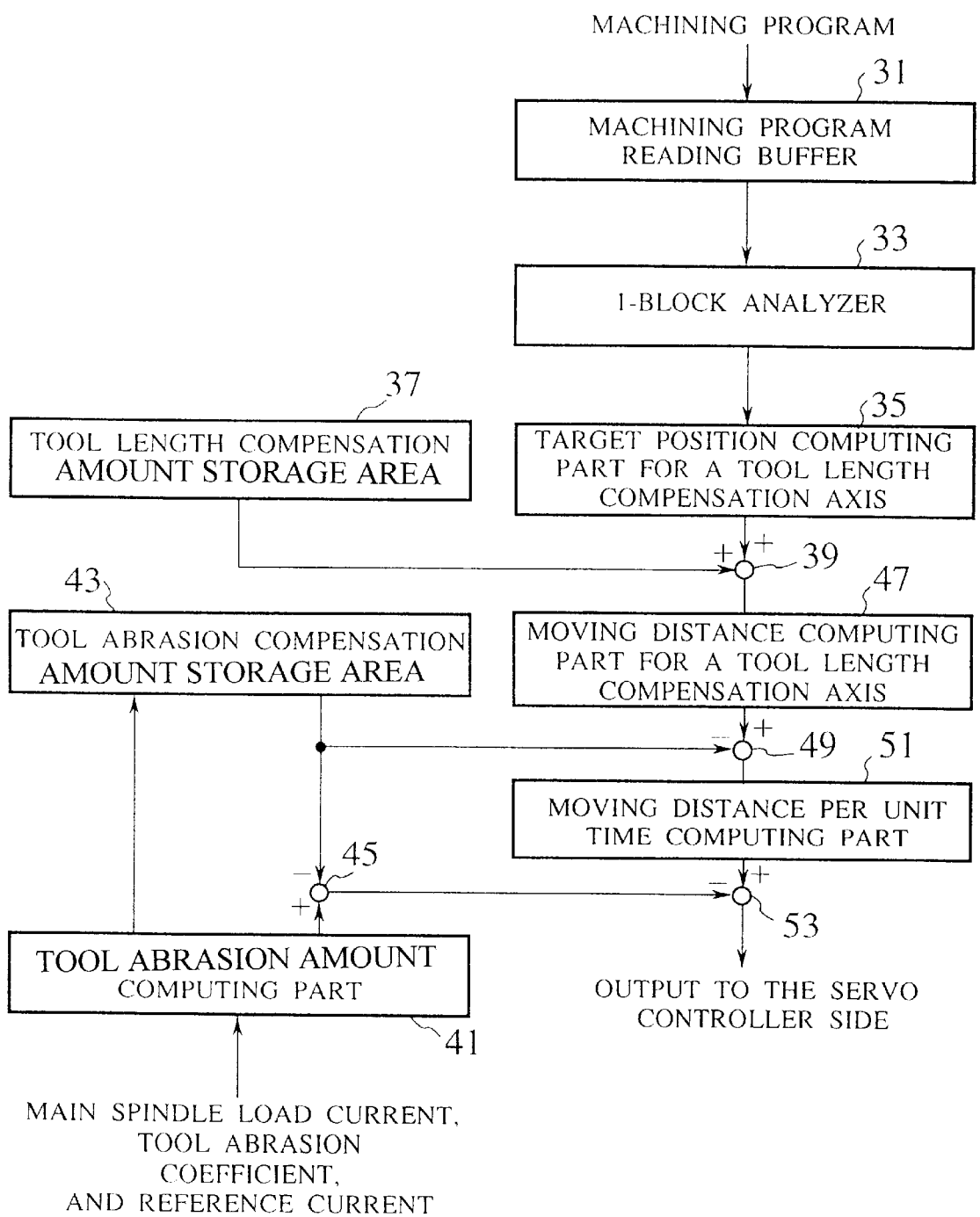
FIG. 2 is a block diagram for showing a concrete composition of a numerically-controlled apparatus implementing a method for dynamically compensating for tool abrasion according to the present invention.

FIG. 2 shows a concrete composition of a numerically-controlled (NC) apparatus implementing a method for dynamically compensating for tool abrasion according to the invention. This method is performed by the CPU 1 which executes a system program.

This numerically-controlled (NC) apparatus comprises a machining program reading buffer 31 for reading a machining program. A 1-block analyzer 33 analyzes the machining program block by block. A target position computing part 35 computes a target position of a tool length compensation axis based on machining program analysis. A tool length compensation amount storing area 37 stores a tool length compensation amount. A tool length compensation computing part 39 performs compensation of the target position of the tool length compensation axis computed by the target position computing part 35 based on a tool length compensation amount registered in the tool length compensation amount storing area 37. An abrasion compensation amount computing part 41 estimates tool abrasion compensation amount (tool abrasion) per unit time based on a reference current-value, a main spindle load current value and a tool length compensation amount. A tool abrasion compensation amount storing area 43 stores a cumulative value of tool abrasion compensation amount computed by the abrasion compensation amount computing part 41. A tool abrasion compensation amount variation integrating part 45 computes variation of a tool abrasion compensation by subtracting the last cumulative value of tool abrasion compensation amount stored in the tool abrasion compensation amount storing area 43 from a new tool abrasion compensation computed by the abrasion compensation computing part 41. A moving distance computing part 47 computes a moving distance to a target position of the tool length compensation axis after compensation of a tool length. A tool abrasion compensation computing part 49 subtracts a tool abrasion compensation amount when executing a block from the moving distance to a target position of the tool length compensation axis. A moving distance per unit time computing part 51 computes a moving distance of each axis at intervals of a unit time (a sampling time) specified corresponding to kinds of machines. Finally, a tool compensation performing part 53 subtracts in real time a variation of a tool abrasion compensation amount computed by the tool abrasion compensation amount variation integrating part 45 from a moving distance computed by the moving distance computing part 51.

A cumulative value of tool abrasion compensation quantities is computed by the following expression in a range of proper use of a tool.

Tool abrasion compensation amount=$k$(main spindle load current value/reference machining current value)$dt$ (1), where $k$ is the abrasion coefficient of a tool, and the abrasion coefficient $k$ is obtained by performing a machining process under a proper condition and measuring (actually measuring) a machining abrasion amount per a certain unit time as taking a main spindle load current value as a reference current value. The abrasion coefficient $k$ is stored in the RAM 7 of the numerically-controlled (NC) apparatus.

Tool abrasion compensation amount (a cumulative value of tool abrasion compensation quantities) obtained by the expression (1) is a value obtained by integrating for a machining time the product of a ratio of a main spindle load current value during an actual machining process to a reference machining current value and the abrasion coefficient $k$ of a tool, and is a value obtained by estimating tool abrasion.

The above-mentioned computation of tool abrasion compensation amount is performed in real time during a machining process, and the compensation is performed in real time as subtracting a tool abrasion compensation amount from a spindle moving distance.

As an example, tool length compensation is described in the following. When performing the tool length compensation, as shown in FIG. 3, the data provided are tool length compensation amount storing area for storing compensation amount of tool length for each tool to be used, a tool abrasion coefficient storing area for storing the abrasion coefficient of each tool, a reference-machining current storing area for storing a main spindle load current value at a time of measuring the abrasion coefficient, and a tool abrasion amount storing area for storing tool abrasion (tool abrasion compensation amount) for each tool.

As to the tool, first, tool length compensation amount A of the tool is read from the tool length compensation amount storing area and the tool abrasion amount storing area. Then, when the 1 block which has been analyzed is actually executed, tool abrasion amount B of the tool is read and the tool length compensation is performed by the following expression:

Total tool length compensation=(tool length compensation amount A)−(tool abrasion amount B) (2).

After a machining process has been started using the tool, an actual tool length compensation amount is adaptively changed by updating tool abrasion amount B in the expression (2) with the latest tool abrasion amount B after computing the tool abrasion amount B (tool abrasion compensation amount) in real time by the expression (1). The tool length compensation amount computed by the expression (2) is reflected in the block next to the current block being currently executed.

A particular embodiment of the invention has been described above in detail, but the invention is not limited to this and it will be apparent to a person related to this industrial field that other various embodiments can be implemented within the scope of the present invention.

What is claimed is:

1. A method for dynamically compensating for tool abrasion in a numerically-controlled machine tool, comprising the steps of;

detecting a machining load acting on a tool during a machining process, estimating abrasion of the tool based on the machining load and a tool abrasion characteristic registered in advance in a memory, and automatically and successively changing a tool position compensation amount based on the abrasion without interruption of said machining process.

2. A method for dynamically compensating for tool abrasion in a numerically-controlled machine tool as claimed in claim 1, comprising the steps of;

obtaining in advance a tool abrasion coefficient based on tool abrasion per unit time when a main spindle load current value is taken as a reference machining current value, and estimating abrasion of the tool based on a cumulative value obtained by integrating, for a machining time, a product of, a ratio of a main spindle load current value during an actual machining process to the reference machining current value, and said tool abrasion coefficient.

3. A method for dynamically compensating for tool abrasion in a numerically-controlled machine tool as claimed in claim 1 or 2, comprising the steps of;

estimating abrasion of a tool in the tool-length direction, and performing tool length compensation by subtracting the abrasion from a tool length compensation amount registered in advance in a memory.

* * * * *